United States Patent
Yang et al.

(10) Patent No.: US 10,367,376 B2
(45) Date of Patent: Jul. 30, 2019

(54) WIRELESS POWER TRANSFER SYSTEM SUPPLYING POWER REQUIRED BY ADIABATIC CIRCUIT

(71) Applicant: Winbond Electronics Corp., Taichung (TW)

(72) Inventors: Chia-Hsiang Yang, Taichung (TW); Ping-Hsuan Hsieh, Taichung (TW); Hsin-Tzu Lin, Taichung (TW)

(73) Assignee: Winbond Electronics Corp., Taichung (TW)

( * ) Notice: Subject to any disclaimer, the term of this patent is extended or adjusted under 35 U.S.C. 154(b) by 236 days.

(21) Appl. No.: 15/263,376

(22) Filed: Sep. 13, 2016

(65) Prior Publication Data

US 2017/0187241 A1    Jun. 29, 2017

(30) Foreign Application Priority Data

Dec. 28, 2015 (CN) .......................... 2015 1 0999018

(51) Int. Cl.
*H02J 50/12* (2016.01)
*H02J 7/02* (2016.01)

(52) U.S. Cl.
CPC .............. *H02J 50/12* (2016.02); *H02J 7/025* (2013.01)

(58) Field of Classification Search
CPC ................................ H02J 7/00; H02J 50/00
USPC ........................................................ 307/104
See application file for complete search history.

(56) References Cited

U.S. PATENT DOCUMENTS

| | | | |
|---|---|---|---|
| 6,242,951 B1 * | 6/2001 | Nakata | G06F 7/505 326/113 |
| 2011/0121813 A1 * | 5/2011 | Sato | H02M 3/155 323/349 |
| 2012/0319498 A1 * | 12/2012 | Silberberg | H02J 5/005 307/104 |

FOREIGN PATENT DOCUMENTS

| | | |
|---|---|---|
| CN | 102158217 | 8/2011 |
| TW | 201308818 | 2/2013 |
| WO | 2011107995 | 9/2011 |

OTHER PUBLICATIONS

Baker et al., "Feedback Analysis and Design of RF Power Links for Low-Power Bionic Systems," IEEE Trans. Biomed. Circuits Syst., Mar. 2007, pp. 28-38.
Ye et al., "QSERL: Quasi-Static Energy Recovery Logic," IEEE J. Solid-state. Circuits, Feb. 2001, pp. 239-248.
Sankman et al., "A 12-µW to 1.1-mW AIM Piezoelectric Energy Harvester for Time-Varying Vibrations with 450-nA IQ," IEEE Trans. Power Electron., Feb. 2015, pp. 632-643.

(Continued)

*Primary Examiner* — Rexford N Barnie
*Assistant Examiner* — Joseph N Inge
(74) *Attorney, Agent, or Firm* — JCIPRNET

(57) ABSTRACT

A wireless power transfer system includes a power supply side and a power reception side. The power supply side is configured to provide wireless power. The power reception side is electrically connected to the power supply side. The power reception side is configured to receive the wireless power and convert the wireless power into power of a required type. The power reception side includes an adiabatic circuit that operates at AC power and a memory circuit that operates at DC power. The adiabatic circuit includes a first circuit and a second circuit. When the first circuit operates during one of a working period and a waiting (Continued)

period, the second circuit operates during the other one of the working period and the waiting period.

9 Claims, 4 Drawing Sheets

(56) References Cited

OTHER PUBLICATIONS

Kotani et al., "High-Efficiency Differential-Drive CMOS Rectifier for UHF RFIDs," IEEE J. Solid-State Circuits, Nov. 2009, pp. 3011-3018.

Lee et al., "A Standard-Cell-Design-Flow Compatible Energy-Recycling Logic With 70% Energy Saving," IEEE Trans. Circuits and Systems—I, Jan. 2016, pp. 70-79.

* cited by examiner

WIRELESS POWER TRANSFER SYSTEM SUPPLYING POWER REQUIRED BY ADIABATIC CIRCUIT

CROSS-REFERENCE TO RELATED APPLICATION

This application claims the priority benefit of China application serial no. 201510999018.1, filed on Dec. 28, 2015. The entirety of the above-mentioned patent application is hereby incorporated by reference herein and made a part of this specification.

TECHNICAL FIELD

The disclosure relates to a power transfer system; more particularly, the disclosure relates to a wireless power transfer (WPT) system that includes an adiabatic circuit.

DESCRIPTION OF RELATED ART

A WPT system is capable of generating a magnetic field through an induction coil and transmitting energy without using any conductive wire nor contacting any conductor, and therefore the WPT system is often applied for wireless radio frequency identification and applied in wireless charging apparatuses. In another aspect, the WPT system has a circuit structure with low power consumption; specifically, the time spent on charging or discharging circuit devices is extended through employing alternating current (AC) power rather than the conventional direct current (DC) power, so as to reduce heat consumption and recycle energy stored in a node capacitor in the circuit. Hence, the adiabatic circuit is characterized by low energy consumption and slow operating speed.

In light of the foregoing, how to combine the adiabatic circuit with the WPT system and reduce energy loss resulting from AC-DC power conversion in order to expand the application of the adiabatic circuit is currently one of the imperative issues in the pertinent field. The WPT system usually includes a complementary metal-oxide semiconductor (CMOS) circuit. According to the related art, if the conventional static CMOS circuit is employed in the WPT system, the entire system is required to include a current rectifying circuit, a voltage regulating circuit, a voltage boosting circuit, and so on. This will lead to additional power consumption.

SUMMARY OF THE DISCLOSURE

The disclosure provides a WPT system capable of reducing energy loss.

In an embodiment of the disclosure, a wireless power transfer system includes a power supply side and a power reception side. The power supply side is configured to provide wireless power. The power reception side is electrically connected to the power supply side. The power reception side is configured to receive the wireless power and convert the wireless power into power of a required type. The power reception side includes an adiabatic circuit operating at AC power. The adiabatic circuit includes a first circuit and a second circuit. When the first circuit operates during one of a working period and a waiting period, the second circuit operates during the other one of the working period and the waiting period.

In view of the above, the WPT system provided in an embodiment of the disclosure includes the adiabatic circuit. The power supply side provides the power required by the adiabatic circuit through performing a charging action in a wireless manner, so as to reduce energy loss resulting from power conversion.

Several exemplary embodiments accompanied with figures are described in detail below to further describe the disclosure in details. It should be understood, however, that the above may not contain all of the aspects and embodiments of the disclosure and may not mean to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Several embodiments are provided below to describe the disclosure; however, the disclosure should not be limited to the embodiments given herein. The embodiments described below can be combined with each other if deemed proper. The word "couple" (or "connect", "electrically connect") in the description and claims may refer to any direct or indirect connection. For instance, in the description and claims, if a first apparatus is coupled to a second apparatus, it means that the first apparatus may be directly connected to the second apparatus or may be indirectly connected to the second apparatus through another apparatus or by another connection means. In addition, the term "signal" may stand for at least one current, voltage, electric charge, temperature, data, electromagnetic wave, or any other signal or signals.

Figure 1:
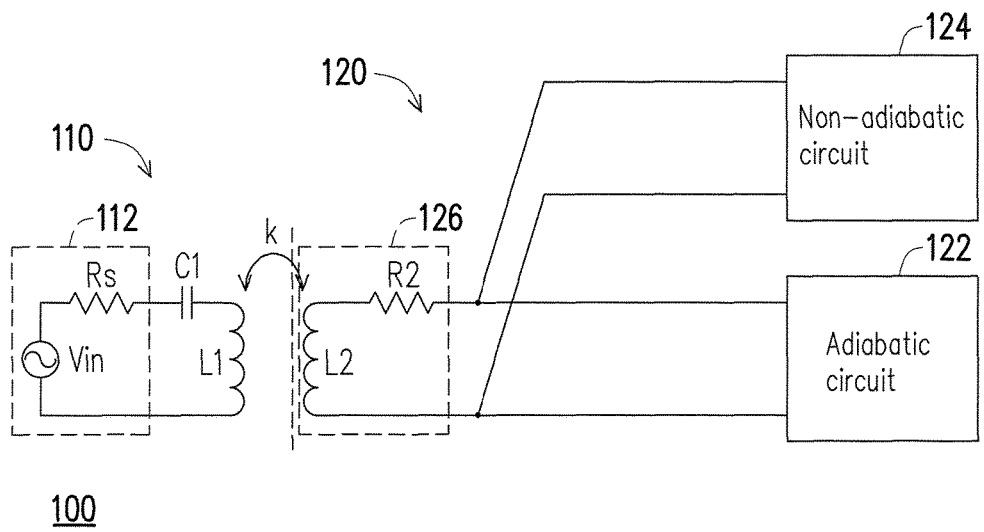
FIG. 1 is schematic view briefly illustrating a WPT system according to an embodiment of the disclosure.

FIG. 1 is schematic view briefly illustrating a WPT system according to an embodiment of the disclosure. With reference to FIG. 1, the wireless power transfer system 100 provided herein includes a power supply side 110 and a power reception side 120. The power reception side 120 is electrically connected to the power supply side 110. The power supply side 110 is configured to provide wireless power to the power reception side 120. The power reception side 120 is configured to receive the wireless power and convert the wireless power into power of a required type. In the present embodiment, the power of the required type includes at least one of AC power and DC power, for instance. The WPT system 100 provided in the present embodiment generates a magnetic field through an induction coil and transmits power without using any conductive wire nor contacting any conductor, and therefore the WPT system 100 can be applied for wireless radio frequency identification and applied in wireless charging apparatuses, e.g., a sensing chargeable mobile phone, an implanted medical apparatus, and so on.

Specifically, in the present embodiment, the power supply side 110 includes a power amplifier circuit 112. The power reception side 120 includes an adiabatic circuit 122, a non-adiabatic circuit 124, and a power conversion circuit 126. In the present embodiment, an input signal Vin received by the power amplifier circuit 112 is a radio frequency (RF) signal, for instance, which should however not be construed as a limitation to the disclosure. A resistor Rs is an inner resistor of the power amplifier circuit 112, and a transmission frequency of the power amplifier circuit 112 is a resonance frequency of a capacitor C1 and an inductor L1. Inductance loss generated by the inductor L1 is less than the loss of the resistor Rs in the power amplifier circuit 112. k is a coupling coefficient of the inductor L1 and the inductor L2. The larger the value of k is, the tighter the connection between the two inductors L1 and L2 is. Here, the value of k is affected by the distance between the two inductors L1 and L2 and the type of media.

In the present embodiment, the inductor L2 of the power conversion circuit 126 serves as an induction coil for receiving wireless power provided by the power supply side 110 and converting the wireless power into power of a different type, and the converted power is transmitted to the adiabatic circuit 122 and the non-adiabatic circuit 124. According to the present embodiment, the adiabatic circuit 122 operates at the AC power, for instance. The adiabatic circuit 122 provided herein has a circuit structure with low power consumption; specifically, the time spent on charging or discharging circuit devices is extended through employing the AC power rather than the DC power, so as to reduce heat consumption and recycle energy stored in a node capacitor in the circuit. Hence, the adiabatic circuit 122 is characterized by low energy consumption and slow operating speed. According to the present embodiment, the non-adiabatic circuit 124 converts the AC power into the DC power and operates at the DC power. In an embodiment of the disclosure, the non-adiabatic circuit 124 includes a rectifier circuit for converting the AC power into the DC power, for instance, such that the non-adiabatic circuit 124 operates at the DC power. In the present embodiment, the method of converting the AC power into the DC power through the rectifier circuit can be derived from the art in the pertinent field and thus will not be elaborated hereinafter.

In the present embodiment, the adiabatic circuit 122 and the non-adiabatic circuit 124 act as the load circuits on the power reception side and can be represented by one set of capacitor and resistor connected in parallel, and the capacitance of the capacitor can be designed to resonate with the inductor L2 at a frequency identical to the frequency of the input signal Vin. The WPT system 100 provided herein is applied in an implanted medical apparatus, for instance, and this should by no means restrict the scope of protection provided in the disclosure. According to the present embodiment, the circuit (e.g., the adiabatic circuit 122) connected to the inductor L2 is arranged in the implanted apparatus. The power supply side 110 is arranged outside the human body, and the power required for operating the implanted apparatus is supplied through skin in a wireless transmission manner. The wireless power provided by the power supply side 110 is categorized into the AC power and the DC power by the power reception side 120. The AC power generated by the inductor L2 is rectified by the non-adiabatic circuit 124 to obtain the DC power, and the DC power is supplied to a memory circuit in the non-adiabatic circuit 124, a latch circuit in the adiabatic circuit 122, and so forth. The AC power is supplied to the adiabatic circuit 122 and acts as the voltage of the specific type required for operation. In an embodiment of the disclosure, the AC power includes two sinusoidal clock voltage sources with opposite phases, for instance, and this should by no means restrict the scope of protection provided in the disclosure.

Hence, in the present embodiment, the WPT system 100 includes the adiabatic circuit 122, and the power required by the adiabatic circuit 122 is directly supplied by the power supply side 110 in a wireless charging manner. Through the wireless power transmission, the power supply side 110 directly supplies the power required for operating the adiabatic circuit 122, so as to reduce the energy loss caused by converting the AC power into the DC power. As such, the adiabatic circuit 122 is suitable for being applied in an implanted biomedical chip, for instance.

In an embodiment of the disclosure, the power conversion circuit 126 is coupled to the adiabatic circuit 122 through a switching circuit, for instance. Through controlling the time period during which the switching circuit is switched on, the power reception side 120 allows the adiabatic circuit 122 to receive the voltage of the required type.

Figure 2:
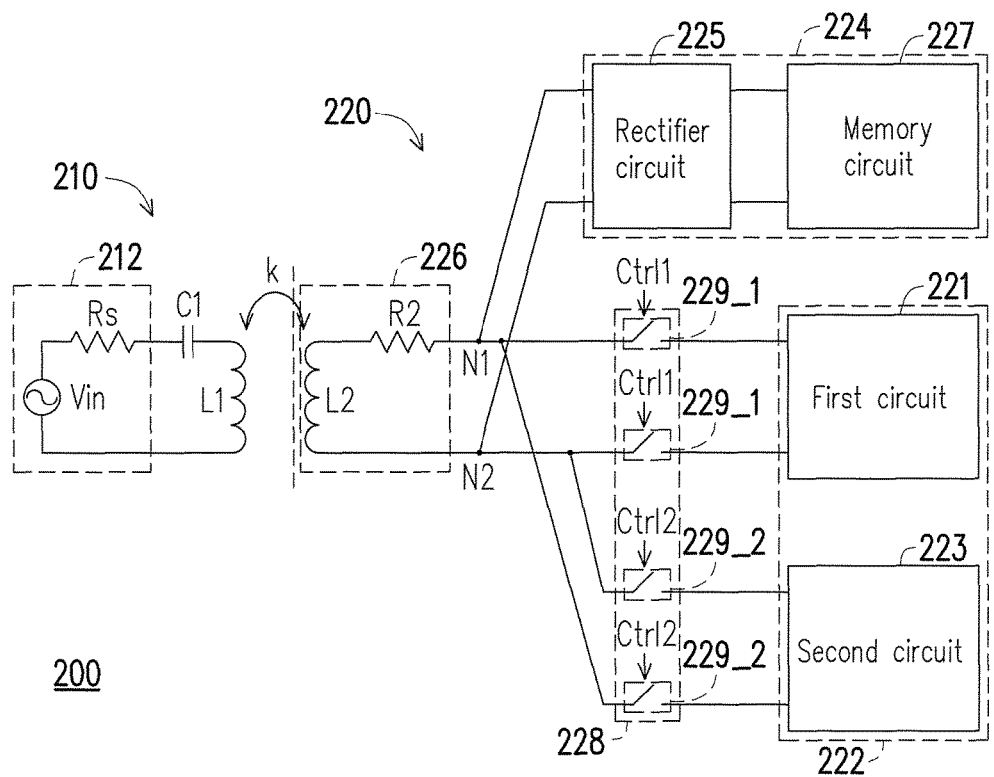
FIG. 2 is schematic view briefly illustrating a WPT system according to another embodiment of the disclosure.

FIG. 2 is schematic view briefly illustrating a WPT system according to another embodiment of the disclosure. With reference to FIG. 2, the WPT system 200 provided in the present embodiment is similar to the WPT system 100 depicted in FIG. 1, whereas one of the differences lies in that the power reception side 220 provided herein further includes a switching circuit 228. In the present embodiment, the switching circuit 228 is coupled between the power conversion circuit 226 and the adiabatic circuit 222 for selectively transmitting the AC power provided by the power conversion circuit 226 to a first circuit 221 or a second circuit 223 according to a first control signal Ctrl1 and a second control signal Ctrl2. For instance, when the switching circuit 228 transfers the AC power to the first circuit 221, the switching circuit 228 does not transfer the AC power to the second circuit 223. By contrast, when the switching circuit 228 transfers the AC power to the second circuit 223, the switching circuit 228 does not transfer the AC power to the first circuit 221.

In the present embodiment, the switching circuit 228 includes a plurality of first switches 229_1 and a plurality of second switches 229_2. The first switches 229_1 are coupled between the power conversion circuit 226 and the first circuit 221 and are controlled by the first control signal Ctrl1. The first switches 229_1 are configured to transfer the AC power to the first circuit 221 according to the first control signal Ctrl1. The second switches 229_2 are coupled between the power conversion circuit 226 and the second circuit 223 and are controlled by the second control signal Ctrl2. The second switches 229_2 are configured to transfer the AC power to the second circuit 223 according to the second control signal Ctrl2. In the present embodiment, the first switches 229_1 and the second switches 229_2 are implemented in form of transmission gates, for instance, which should however not be construed as a limitation to the disclosure. Said implementation can be derived from the art in the pertinent field and thus will not be elaborated hereinafter.

In the present embodiment, the first switches 229_1 and the second switches 229_2 implemented in form of the transmission gates consume power in two different ways, i.e., power loss (first consumed power) due to the on-resistance of transistors in the transmission gates and power (second consumed power) consumed by gate capacitance of the transistors while the transmission gates are turned on or turned off. In the present embodiment, the larger the devices in the transmission gates, the smaller the conductive resistance (the smaller the first consumed power), and the larger the gate capacitance (the larger the second consumed power). When the first consumed power is close to the second consumed power, the total power consumed by the transmission gates has the minimum value. If different operating voltages are given, the conductive resistances of the p-type metal-oxide semiconductor (pMOS) transistor and the n-type metal-oxide semiconductor (nMOS) have different values according to the present embodiment. In the transmission gates, the operating voltage of the pMOS transistor is 0.5V to 1V. When the operating voltage is close to 0.5V, the conductive resistance of the pMOS is increased. If the channel width of the nMOS is expanded, the conductive resistance of the pMOS is reduced when the pMOS operates at 0.5V, such that the level of variations in the conductive resistance within the entire operating voltage range is reduced. By contrast, the operating voltage of the nMOS transistor in the transmission gates is 0V to 0.5V. If the channel width of the pMOS is expanded, the conductive resistance of the nMOS is reduced when the nMOS operates at 0.5V, such that the level of variations in the conductive resistance of different transistors within the entire operating voltage range is reduced. Hence, in the present embodiment, if the first switches 229_1 and the second switches 229_2 are implemented in form of the transmission gates, the proportion of the dimensions of the transistors in the transmission gates can be adjusted according to actual design requirements, which should not be construed as a limitation to the disclosure.

In the present embodiment, the switching circuit 228 selectively transmits the AC power provided by the power conversion circuit 226 to the first circuit 221 or the second circuit 223 according to the first control signal Ctrl1 and the second control signal Ctrl2. The power conversion circuit 226 provided herein transmits the AC power to the switching circuit 228 and the non-adiabatic circuit 224 through nodes N1 and N2, respectively, for instance. In the present embodiment of the disclosure, the non-adiabatic circuit 224 includes a rectifier circuit 225 and a memory circuit 227, for instance, and this should by no means restrict the scope of protection provided in the disclosure. The rectifier circuit 225 is configured to convert the AC power into the DC power and provide the DC power to the memory circuit 227. The memory circuit 227 operates at 0V and 1V, as exemplarily shown in FIG. 7.

In the present embodiment, the WPT system 200 further includes a control circuit for generating the first control signal Ctrl1 and the second control signal Ctrl2, for instance, so as to turn on or turn off the first switches 229_1 and the second switches 229_2.

Figure 3:
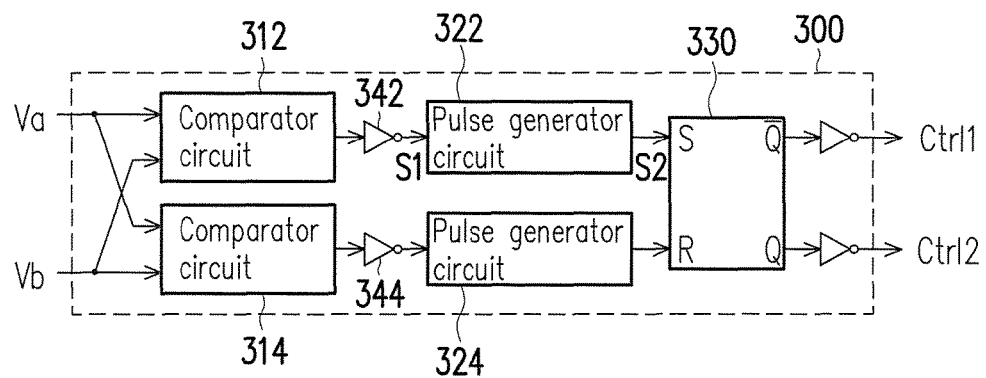
FIG. 3 is schematic view briefly illustrating a control circuit according to an embodiment of the disclosure.
Figure 4:
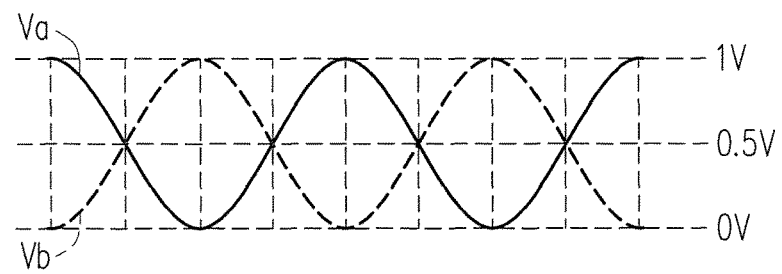
FIG. 4 is a schematic view illustrating a waveform of AC power according to an embodiment of the disclosure.
Figure 5:
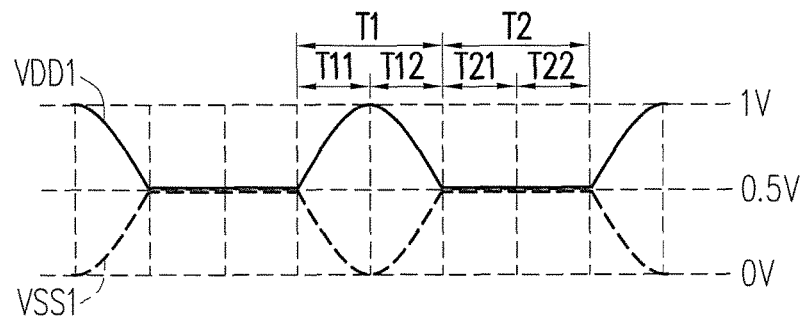
FIG. 5, FIG. 6, and FIG. 7 are schematic views illustrating waveforms of operating voltages at different circuit blocks according to an embodiment of the disclosure.
Figure 6:
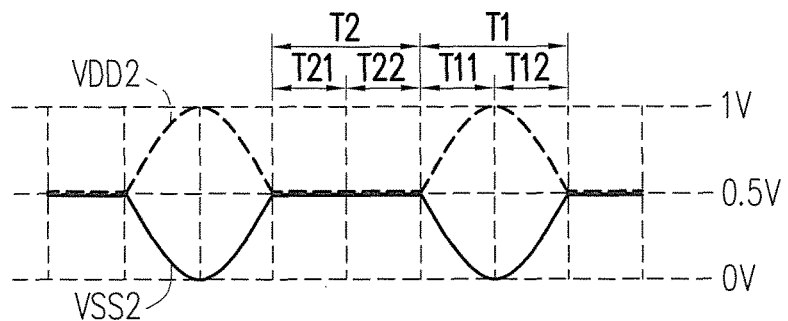
Figure 7:
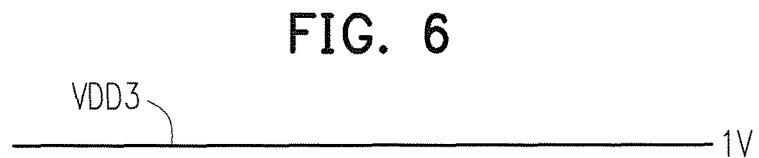

FIG. 3 is schematic view briefly illustrating a control circuit according to an embodiment of the disclosure. FIG. 4 is a schematic view illustrating a waveform of AC power according to an embodiment of the disclosure. FIG. 5, FIG. 6, and FIG. 7 are schematic views illustrating waveforms of operating voltages at different circuit blocks according to an embodiment of the disclosure. With reference to FIG. 2 to FIG. 7, the power conversion circuit 226 provided herein transmits the AC power to the switching circuit 228 and the non-adiabatic circuit 224 through the nodes N1 and N2, respectively, for instance. The signal waveform of the AC power at the nodes N1 and N2 is shown in FIG. 4. In the present embodiment, the AC power includes a first AC signal Va and a second AC signal Vb that are transmitted to the switching circuit 228, the non-adiabatic circuit 224, and the control circuit 300 through the nodes N1 and N2, respectively.

In the present embodiment, the control circuit 300 is configured to compare a voltage of the first AC signal Va and a voltage of the second AC signal Vb, so as to generate the first control signal Ctrl1 and the second control signal Ctrl2. If the voltage of the first AC signal Va is larger than the voltage of the second AC signal Vb, the control circuit 300 outputs the first control signal Ctrl1 at logic 1 to turn on the first switches 229_1 of the switching circuit 228, for instance, such that the first switches 229_1 transfer the AC power to the first circuit 221 according to the first control signal Ctrl1. By contrast, if the voltage of the first AC signal Va is smaller than the voltage of the second AC signal Vb, the control circuit 300 outputs the second control signal Ctrl2 at logic 1 to turn on the second switches 229_2 of the switching circuit 228, for instance, such that the second switches 229_2 transfer the AC power to the second circuit 223 according to the second control signal Ctrl2. Hence, in the present embodiment, the control circuit 300 determines the time at which the first switches 229_1 and the second switches 229_2 are turned on or turned off according to the value of the voltage of the first AC signal Va and the value of the voltage of the second AC signal Vb. The first circuit 221, the second circuit 223, and the memory circuit 227 provided herein respectively operate at the voltages with the waveform shown in FIG. 5 to FIG. 7, for instance. The first circuit 221 operates at the AC power with the waveforms VDD1 and VSS1 (half-circle sinusoidal waves) is given (as shown in FIG. 5), for instance. The second circuit 223 operates at the AC power with the waveforms VDD2 and VSS2 (half-circle sinusoidal waves) is given (as shown in FIG. 6), for instance. The memory circuit 227 operates at the DC power with the waveforms VDD3 and VSS3 is given (as shown in FIG. 7), for instance. In the schematic view illustrating the waveforms in FIG. 5 to FIG. 7, the voltage levels 0V, 0.5V, and 1V are merely exemplary and should not be construed as limitations to the disclosure.

Figure 8:
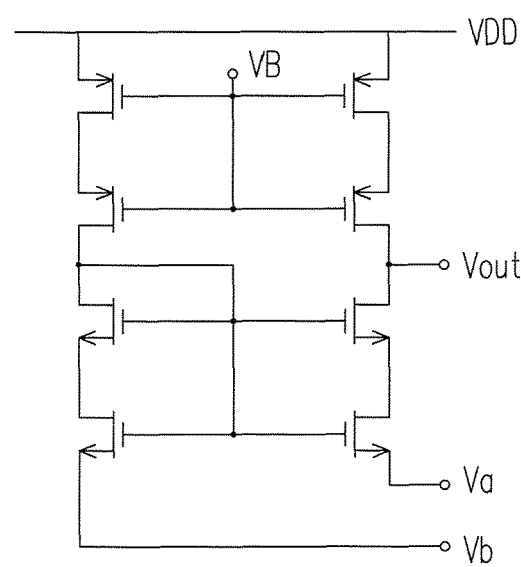
FIG. 8 is a schematic view illustrating an internal circuit of a comparator circuit provided in the embodiment shown in FIG. 3.
Figure 9:
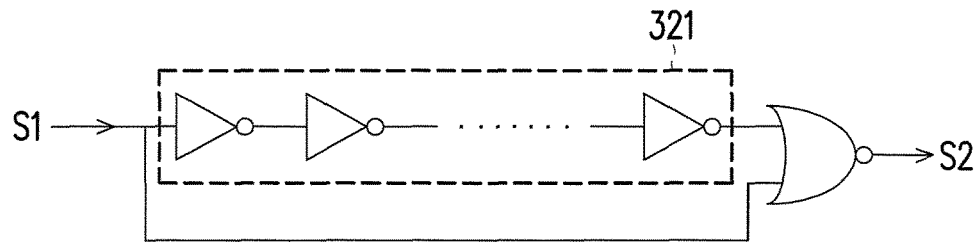
FIG. 9 is a schematic view illustrating an internal circuit of a pulse generator circuit provided in the embodiment shown in FIG. 3.

FIG. 8 is a schematic view illustrating an internal circuit of a comparator circuit provided in the embodiment shown in FIG. 3. FIG. 9 is a schematic view illustrating an internal circuit of a pulse generator circuit provided in the embodiment shown in FIG. 3. With reference to FIG. 3, FIG. 8, and FIG. 9, FIG. 8 schematically illustrates the internal circuit of the comparator circuit 312, for instance. The internal circuit of the comparator circuit 314 can be deduced from and can be the same as or different from the internal circuit of the comparator circuit 312. FIG. 9 schematically illustrates the internal circuit of the pulse generator circuit 322, for instance. The internal circuit of the pulse generator circuit 324 can be deduced from and can be the same as or different from the internal circuit of the pulse generator circuit 322.

In the present embodiment, if the voltage of the first AC signal Va is larger than the voltage of the second AC signal Vb, the output signal Vout of the comparator circuit 312 is charged to reach the voltage VDD. If the voltage of the first AC signal Va is smaller than the voltage of the second AC signal Vb, the output signal Vout varies together with the waveform of the first AC signal Va (i.e., 0V-0.5V half-circle sinusoidal wave). After the output by the inverter 342, significant delay may occur in the event of logic 1. The operation of the comparator circuit 314 can be deduced from the above and thus will not be further described. In the present embodiment, the control circuit 300 further includes pulse generator circuits 322 and 324 as well as an S-R latch circuit 330 to detect falling edges of output signals of the inverters 342 and 344; thereby, balanced and accurate first control signal Ctrl1 and second control signal Ctrl2 can be obtained. The delay circuit 321 of the pulse generator circuit 322 provided in the present embodiment includes an odd number of delay cells, for instance. According to the present embodiment, the method of operating the comparator circuits 312 and 314, the pulse generator circuits 322 and 324, and the S-R latch circuit 330 can be derived from the art in the pertinent field and thus will not be elaborated hereinafter.

Hence, as provided herein, if the voltage of the first AC signal Va is larger than the voltage of the second AC signal Vb, the control circuit 300 outputs the first control signal Ctrl1 at logic 1 to turn on the first switches 221_1 connected to the first circuit 221 and turn off the second switches 229_2 connected to the second circuit 223, for instance. By contrast, if the voltage of the first AC signal Va is smaller than the voltage of the second AC signal Vb, the control circuit 300 outputs the first control signal Ctrl1 at logic 0 to turn off the first switches 221_1 connected to the first circuit 221 and turn on the second switches 229_2 connected to the second circuit 223, for instance. Thereby, the first circuit 221 receives a half-circle sinusoidal wave VDD1 at 0.5V-1V and a half-circle sinusoidal wave VSS1 at 0V-0.5V, and the second circuit 223 receives a half-circle sinusoidal wave VDD2 at 0.5V-1V and a half-circle sinusoidal wave VSS2 at 0V-0.5V.

Figure 10:
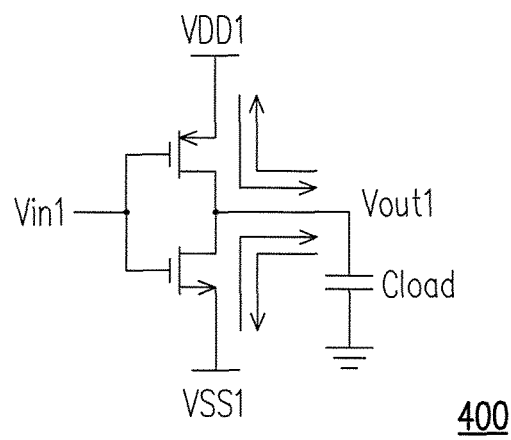
FIG. 10 is schematic view briefly illustrating an energy recycling logic circuit according to an embodiment of the disclosure.

In the embodiment shown in FIG. 2, each of the first circuit 221 and the second circuit 223 respectively includes an energy recycling logic circuit. FIG. 10 is schematic view briefly illustrating an energy recycling logic circuit according to an embodiment of the disclosure. Specifically, FIG. 10 is schematic view briefly illustrating the energy recycling logic circuit 400 of the first circuit 221, for instance. The internal structure of the energy recycling logic circuit of the second circuit 223 can be deduced from that of the energy recycling logic circuit 400 of the first circuit 221. With reference to FIG. 2, FIG. 5, FIG. 6, and FIG. 10, in the first circuit 221, for instance, the energy recycling logic circuit 400 operates at the AC power VDD1 and the AC power VSS1, and the energy recycling logic circuit 400 is configured to receive an input signal Vin1 and generate an output signal Vout1 according to the AC power VDD1 and the AC power VSS1. According to the present embodiment, as shown in FIG. 5 and FIG. 6, when the energy recycling logic circuit 400 of the first circuit 221 operates during the working period T1, the energy recycling logic circuit of the second circuit 223 operates during the waiting period T2. On the contrary, when the energy recycling logic circuit 400 of the first circuit 221 operates during the waiting period T2, the energy recycling logic circuit of the second circuit 223 operates during the working period T1. That is, when the first circuit 221 operates during one of the working period T1 and the waiting period T2, the second circuit 223 operates during the other one of the working period T1 and the waiting period T2. In the present embodiment, the working period T1 includes an evaluation stage T11 and a recycling stage T12, and the waiting period T2 includes a first waiting stage T21 and a second waiting stage T22.

Besides, as provided in the embodiment depicted in FIG. 2 and FIG. 3, the control circuit 300 controls the manner in which the switching circuit 228 transmits signals. When the first circuit 221 or the second circuit 223 receives the AC power, the first circuit 221 or the second circuit 223 operates during the working period T1. When the first circuit 221 or the second circuit 223 does not receive the AC power, the first circuit 221 or the second circuit 223 operates during the waiting period T2.

Figure 11:
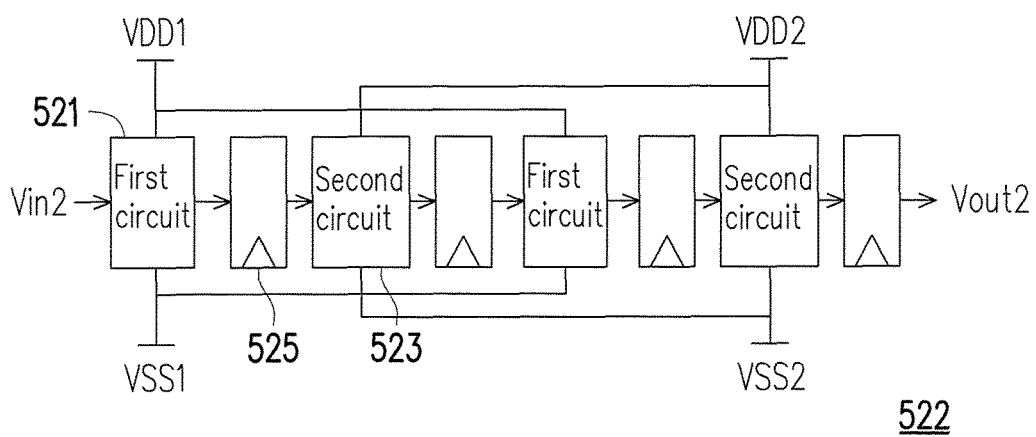
FIG. 11 is schematic internal view illustrating an adiabatic circuit according to an embodiment of the disclosure.

FIG. 11 is schematic internal view illustrating an adiabatic circuit according to an embodiment of the disclosure. With reference to FIG. 2 and FIG. 11, in the adiabatic circuit 522 provided in the present embodiment, the first circuit 521 and the second circuit 523 are serially coupled to each other and alternately arranged. A latch circuit 525 is further arranged between the first circuit 521 and the second circuit 523. The first circuit 521 operates at the AC power VDD1 and the AC power VSS1, and the second circuit 523 operates at the AC power VDD2 and the AC power VSS2.

Particularly, in the present embodiment, each of the working period T1 and the waiting period T2 of the adiabatic circuit 522 accounts for half the cycle; hence, each circuit block in the pipelining structure is categorized into different blocks in the first and second circuits 521 and 523 that are alternately arranged. When the first circuit 521 works in the working period T1, the second circuit 523 waits in the waiting period T2. On the contrary, when the second circuit 523 works in the working period T1, the first circuit 521 waits in the waiting period T2.

To sum up, the wireless transmission technology is applied by the WPT system provided herein to operate the adiabatic circuit. The adiabatic circuit characterized by low power consumption is suitable for being applied to the implanted biomedical apparatus and circuit, and the adiabatic circuit operates in a manner different from that of the conventional COMS circuit. Besides, in an embodiment of the invention, the WPT system requires the power transmitted through wireless transmission, which is also adapted to the operation of the adiabatic circuit. When the adiabatic circuit is applied in the implanted biomedical apparatus, the apparatus is directly charged outside the human body through wireless transmission, such that the AC power can satisfy the requirement of the adiabatic circuit.

Although the disclosure has been provided with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:
1. A wireless power transfer system comprising:
   a power supply side configured to provide wireless power; and
   a power reception side electrically connected to the power supply side and configured to receive the wireless power and convert the wireless power into power of a required type,
   wherein the power reception side comprises an adiabatic circuit operating at alternating current power, the adiabatic circuit comprises a first circuit and a second circuit, each of the first circuit and the second circuit comprises an energy recycling logic circuit that is operated at the alternating current power and is configured to receive an input signal and generate an output signal according to the alternating current power, and when the energy recycling logic circuit of the first circuit operates during one of a working period and a waiting period, the energy recycling logic circuit of the second circuit operates during the other one of the working period and the waiting period.

2. The wireless power transfer system of claim 1, wherein the power reception side further comprises:
   a switching circuit electrically connected to the adiabatic circuit and configured to transfer the alternating current power to the adiabatic circuit, wherein when the switching circuit transfers the alternating current power to one of the first circuit and the second circuit, the switching circuit does not transfer the alternating current power to the other one of the first circuit and the second circuit.

3. The wireless power transfer system of claim 2, wherein the alternating current power comprises a first alternating current signal and a second alternating current signal, and the power reception side further comprises:
   a control circuit configured to compare a voltage of the first alternating current signal and a voltage of the second alternating current signal, so as to generate control signals, the control signals comprising a first control signal and a second control signal,
   wherein if the voltage of the first alternating current signal is larger than the voltage of the second alternating current signal, the switching circuit transfers the alternating current power to the first circuit according to the first control signal, and if the voltage of the first alternating current signal is smaller than the voltage of the second alternating current signal, the switching circuit transfers the alternating current power to the second circuit according to the second control signal.

4. The wireless power transfer system of claim 3, wherein the switching circuit comprises:
   first switches electrically connected to the first circuit and configured to transfer the alternating current power to the first circuit according to the first control signal; and
   second switches electrically connected to the second circuit and configured to transfer the alternating current power to the second circuit according to the second control signal.

5. The wireless power transfer system of claim 1, wherein when the first circuit or the second circuit receives the alternating current power, the first circuit or the second circuit operates during the working period, and when the first circuit or the second circuit does not receive the alternating current power, the first circuit or the second circuit operates during the waiting period.

6. The wireless power transfer system of claim 1, wherein the first circuit and the second circuit in the adiabatic circuit are serially coupled to each other and alternately arranged.

7. The wireless power transfer system of claim 1, wherein the working period comprises an evaluation stage and a recycling stage, and the waiting period comprises a first waiting stage and a second waiting stage.

8. The wireless power transfer system of claim 1, wherein the power reception side further comprises:
   a non-adiabatic circuit electrically connected to the adiabatic circuit, the non-adiabatic circuit converting the alternating current power into direct current power and operating at the direct current power.

9. The wireless power transfer system of claim 1, wherein the power reception side further comprises:
   a power conversion circuit electrically connected to the adiabatic circuit and configured to convert the wireless power into the alternating current power and transfer the alternating current power to the adiabatic circuit.

* * * * *